United States Patent
Wada

(10) Patent No.: US 7,436,435 B2
(45) Date of Patent: Oct. 14, 2008

(54) IMAGE TAKING DEVICE HAVING IMAGE-BLUR COMPENSATOR

(75) Inventor: Shigeru Wada, Kishiwada (JP)

(73) Assignee: Minolta Co., Ltd., Osaka (JP)

( * ) Notice: Subject to any disclaimer, the term of this patent is extended or adjusted under 35 U.S.C. 154(b) by 823 days.

(21) Appl. No.: 10/260,503

(22) Filed: Sep. 30, 2002

(65) Prior Publication Data

US 2003/0067544 A1    Apr. 10, 2003

(30) Foreign Application Priority Data

Oct. 1, 2001 (JP) ............................. 2001-305227
Oct. 1, 2001 (JP) ............................. 2001-305228
Oct. 1, 2001 (JP) ............................. 2001-305229

(51) Int. Cl.
    *H04N 5/228* (2006.01)
(52) U.S. Cl. ............................. 348/208.4; 348/208.99; 348/208.2
(58) Field of Classification Search ............. 348/219.1, 348/208.99, 208.2, 208.4, 342, 374
    See application file for complete search history.

(56) References Cited

U.S. PATENT DOCUMENTS

| | | | | |
|---|---|---|---|---|
| 4,780,739 A | | 10/1988 | Kawakami et al. | 354/430 |
| 5,155,520 A | * | 10/1992 | Nagasaki et al. | 396/53 |
| 5,214,513 A | * | 5/1993 | Lee | 348/207.99 |
| 5,673,083 A | * | 9/1997 | Izumi et al. | 348/340 |
| 5,675,149 A | * | 10/1997 | Wood et al. | 250/332 |
| 6,031,998 A | | 2/2000 | Shono | 396/75 |
| 6,452,149 B1 | * | 9/2002 | Yamashita et al. | 250/208.1 |
| 6,587,148 B1 | | 7/2003 | Takeda et al. | 348/342 |
| 6,657,671 B1 | | 12/2003 | Sasaki | 348/367 |
| 6,781,622 B1 | * | 8/2004 | Sato et al. | 348/208.4 |
| 6,816,199 B1 | * | 11/2004 | Ide | 348/350 |
| 6,828,540 B2 | * | 12/2004 | Landolt | 250/208.1 |

(Continued)

FOREIGN PATENT DOCUMENTS

JP     62-058784 A     3/1987

(Continued)

OTHER PUBLICATIONS

Japanese "Notice of Rejection", dated May 20, 2004, for counterpart Japanese Patent Application No. 2001-305229; Together with an English-language translation thereof.

(Continued)

*Primary Examiner*—Lin Ye
*Assistant Examiner*—Kelly Jerabek
(74) *Attorney, Agent, or Firm*—Sidley Austin LLP

(57) ABSTRACT

A compensator for correcting a possible blur of image caused by a shake of an image pickup apparatus in which the compensator is arranged, and in which a downsize circuit board having a diminished area thereof and holding an image taking component is swung or moved. The compensator includes the circuit board with the diminished area for holding the image taking component, in which the circuit board is moved together with the image taking component. On the circuit board, there are arranged the image taking component and at least one other component. The at least one other component can be a component which is associated with reading of the signal(s) of the image outputted from the image taking element, and/or can be a component which is associated with the control to correct the possible blur of the image caused by the shake of the image pickup apparatus.

12 Claims, 9 Drawing Sheets

U.S. PATENT DOCUMENTS

| | | | |
|---|---|---|---|
| 6,967,677 B1 * | 11/2005 | Gfeller | 348/208.99 |
| 6,992,700 B1 * | 1/2006 | Sato et al. | 348/208.2 |
| 2002/0012062 A1 * | 1/2002 | Fushimi et al. | 348/342 |

FOREIGN PATENT DOCUMENTS

| | | |
|---|---|---|
| JP | 03-120986 A | 5/1991 |
| JP | 06-027421 A | 2/1994 |
| JP | 06-046314 A | 2/1994 |
| JP | 06-046322 A | 2/1994 |
| JP | 09-116910 A | 5/1997 |
| JP | 9-219825 A | 8/1997 |
| JP | 10-145663 A | 5/1998 |
| JP | 10-327359 A | 12/1998 |
| JP | 11-75121 A | 3/1999 |
| JP | 11-261045 A | 9/1999 |
| JP | 11-295579 A | 10/1999 |
| JP | 2-24680 U | 2/2000 |
| JP | 2000-258813 A | 9/2000 |
| JP | 2000-307937 A | 11/2000 |

OTHER PUBLICATIONS

Japanese "Report on Preliminary Examinatioin", dated Dec. 3, 2004, for counterpart Japanese Patent Application No. 2001-305229; Together with an English-language translation thereof.

* cited by examiner

IMAGE TAKING DEVICE HAVING IMAGE-BLUR COMPENSATOR

This application is based upon application Nos. 2001-305227, 2001-305228 and 2001-305229 filed in Japan, the contents of which are hereby incorporated by reference.

BACKGROUND OF THE INVENTION

1. Field of the Invention

The present invention relates to an image taking device which is equipped in a camera such as a digital camera, and particularly relates to the image taking device which has the function to correct, or compensate, any possible image blur caused by a shake of a body of the camera, in which an image taking element is mounted movably in parallel with its light receiving surface.

2. Description of the Related Arts

An active compensation (or active correction) technology for compensating, or correcting, an image blur which may be caused by a misalignment of optical axis on the basis of a shake, in which the whole optical system or a part thereof is moved or swung, is generally divided into the following three types: a first type in which a compensation optical system is moved or swung, a second type in which an entire optical system is moved or swung, and a third type in which an image taking element is moved or swung. Of all the three types of image-blur compensators, the second type thereof is hardly put to practical use, not only because the member to be swung therein is large in mass and a large amount of energy is required for driving the member, but also because the volume of the member to be swung is large, thus increasing the overall size of the apparatus equipped with this type of image-blur compensator.

The third type thereof is disclosed, for example, in Japanese Laid-Open Patent Publication Nos. 9-116910 and 6-46314. The third type has many advantages like: few limitations put on design due to its optical sensitivity, a wide range of variations in which it is possible to apply this type to all kinds of lenses, and low cost. However, this type has disadvantages like: difficulty of maintaining the flatness of the plane to be moved or swung, and difficulty of processing the circuit board around the image taking element.

That is, in the third type of the image-blur compensator, the precision for detecting error(s) in movement must be higher as the number of pixels increases, and the mass and the amount in movement of the member to be moved or swung are apt to be larger in comparison with those of the type in which a lens is driven. This increases the area of the circuit board as a drive mechanism or driver, which results in an increase in the size of the image taking apparatus. The above problem is improved by separating the circuit board around the image taking element from the image taking element and by arranging it as a separate member. However, the signal outputted from the image taking element is weak or faint, and it is susceptible to noises picked up in the connection part.

Meanwhile, concerning the third type thereof, it is difficult to provide a construction, or structure, to prevent dust or foreign matter from entering thereinto, and it is therefore difficult to completely seal the image taking element. In other words, there has been a problem that the dust adheres to the surface of the image taking element, and that the dust itself is also photographed. The conventional image blur compensation mechanism (or image-blur compensator) in which the image taking element is swung or moved, does not include any countermeasure to solve this problem.

Meanwhile, Japanese Laid-Open Patent Publication No. 9-116910 discloses an image taking device in which high-frequency components of a subject (or an object) to be photographed are restricted prior to spatial sampling by the image taking element.

In this image taking device, the position of the image taking element is changed with respect to the position of the object image (or subject image) focussed on the image taking element during its exposure period of the image taking device so that two-dimensional spatial frequency characteristic is obtained, and so that its moire is reduced by diminishing deformation or distortion of the image by changing the frequency characteristic. That is, in the image taking device, the relative position of the image taking element to the focussing means can be changed. FIG. 1 of the same publication discloses a drive mechanism, or driver, for changing the position of the image taking element.

In the drive mechanism, the image taking element is disposed in a space defined by an L-shaped holding member, and one side of the holding member and one side of the image taking element are coupled together by a piezoelectric element so that the image taking element can be swung, or moved, in an X direction. In order to swing, or move, the holding member itself thus coupled to the image taking element in a Y direction perpendicular to the X direction, the other side of the holding member and a base are coupled together by a piezoelectric element. By applying a voltage having a waveform expressed by a trigonometrical function to each of the piezoelectric elements, the piezoelectric elements expand and contract, so that their movements are superimposed on each other. As a result, the image taking element is swung, or moved, circularly or elliptically.

However, according to the drive mechanism in which the image taking element is directly connected to a piezoelectric element as described above, the range of movement of the image taking element is extremely limited and small. Therefore, the drive mechanism cannot be employed as a mechanism for moving the image taking element over a wider range or greater distance, which is, for example, employed for correcting the misalignment of optical axis in order to compensate image blur possibly caused by an apparatus shaken manually. In order that the range of movement of the image taking element is larger, it cannot be helped that the drive mechanism must be also larger in size, which in turn leads to an image taking device, including the drive mechanism, of larger size.

SUMMARY OF THE INVENTION

Accordingly, it is an object of the present invention to provide an image taking device having an image-blur compensator, or to provide the image taking device that compensates or corrects a blur of image which is caused by a vibration of the image taking device, in which a downsize circuit board (or downsize substrate) having a reduced area thereof and holding an image taking element for taking the image is swung or moved together with the image taking element.

It is another object of the present invention to provide the image taking device, in which a dustproof structure for preventing the entry of dust, or foreign matter, into the image taking element is provided so that the dust is not photographed.

It is still another object of the present invention to provide the image taking device that is small in size, in which the image taking element is movably arranged therein.

In accomplishing these and other objects of the present invention, according to one aspect thereof, there is provided an image taking device comprising: a circuit board; an image taking element which is held by the circuit board; and at least one component which is held by the circuit board, wherein the image taking element is moved or swung together with the circuit board so as to compensate a blur of image which is taken by the image taking element, in which the blur of image is caused by a vibration of the image taking device.

The image taking device, for example, can be employed in an apparatus, such as a digital camera, which requires a compensation or correction of the blur of the image taken by the image taking element.

The function of the at least one component is not limited to a particular one. For example, the at least one component can be a component which is employed in a circuit for converting a signal outputted from the image taking element into a signal of image, the at least one component can be a component for controlling the swing or movement of the image taking element, and the like.

In the image taking device, in addition to the circuit board (hereinafter, also referred to as a first circuit board), there can be provided a second circuit board on which at least one other component is held or mounted. The second circuit board can be such a circuit board as performing a single process in cooperation with the first circuit board. That is, the circuit scale (circuit size or circuit dimension) of the first circuit board swung or moved together with the image taking element, can be set to an arbitrary scale at the time of design. For example, when the first circuit board is small in scale, more components can be mounted on the second circuit board. Also, for example, when the first circuit board is large in scale, there is not necessarily provided the second circuit board. However, in this case, the member to be driven together with the image taking element increases in size, and a large space for movement is required.

Namely, according to the above construction, the at least one component is mounted, or held, on the first circuit board. Therefore, even when the second circuit board is provided, the load to the second circuit board can be reduced. In other words, according to the construction, it is easy to divide the circuit board into two sub-boards for example, and to equalize the ratio of the load between the boards, and to arbitrarily set the circuit board(s) in accordance with the condition of the swing, such as the width of swing, of the image taking element.

That is, according to the construction, it is possible to reduce the size or area of the circuit board and to reduce the space for the movement thereof; therefore, the overall dimension of the image taking device can be reduced in size.

The image taking device can be embodied as follows. For example, the at least one component is a component for reading a signal of the image which is taken by the image taking element.

In the mechanism, the component for reading the signal of the image is such a component as forming a circuit for actuating the image taking element in order to convert the signal (s) outputted from the image taking element into the signal(s) of image, for reading the outputted signal(s), and for amplifying the signal(s) thus readout. More specifically, the circuit, for example, can be an image taking element driver for driving the image taking element and for reading out the outputted signal(s), a pulse generator, and a pre-amplifier for amplifying the outputted signal(s), etc.

In the mechanism, the image taking element and the component for reading the signal of the image are arranged on the same circuit board. Namely, the distance for signal transmission from the image taking element to the component for reading the signal of the image is reduced; therefore, its image noise is sufficiently suppressed.

Alternatively, or in the mechanism, the at least one component can be a component for processing a signal of the image which is taken by the image taking element.

In the mechanism, the component for processing the signal of the image is such a component as designating a color, or colors, to the photoelectric signal(s) outputted from the image taking element, and as converting the photoelectric signal(s) having the color designation into the signal(s) of image. For example, the component for processing the signal of the image can be a component which is employed in a color separation circuit for separating the photoelectric signal(s) into R, G and B signals, a component which is employed in an AD conversion circuit for converting analog signal(s) into digital signal(s), a component which is employed in a processing circuit for white balance adjustment, or the like. According to the mechanism, the outputted signal(s) from the image taking element is/are converted into the image signal(s) by use of the component on the same circuit board on which the image taking element is held or mounted, image noise can be further suppressed.

Alternatively, the at least one component can be a component for controlling the compensation of the blur of the image.

In the mechanism, for example, when the image taking device is provided in a digital camera, as one example, in which the image taking element is swung or moved so as to compensate or correct the shift, or swerve, of the optical axis due to movement, causing the blur of the image, of the body of the camera while the user manually handles the camera, the component for controlling the compensation of the blur of the image can be, for example, a component for detecting the blur which is employed in a gyro circuit, a component which is employed in a control circuit for calculating the amount of movement of the image taking element, or the like.

Alternatively, or in the mechanism, the at least one component can be a component for detecting the amount of the manual shake.

In the mechanism, for example, the component for detecting the amount of the manual shake can be any type of component for detecting the amount thereof employed in the gyro circuit. Generally, it is necessary that the value detected by the component for detecting the amount of the manual shake, or vibration, be inputted to a control circuit such as a microcomputer, and that the amount of movement of the image taking element be calculated on the basis of data or information, for example, upon the current position of the image taking element. According to the mechanism, the component for detecting the amount of the vibration is directly mounted or held on the same circuit board on which the image taking element is mounted, and the swing of the image taking element and the swing of the component for detecting the amount of the vibration are directly interlocked with each other. Therefore, by controlling the movement thereof so that the detection value of the component for detecting the amount of the vibration is zero, the compensation or correction of the image blur is performed without calculation of the amount of the vibration.

According to another aspect of the present invention, there is provided an image taking device comprising: an image taking element which is provided movably in parallel with a light receiving surface of the image taking element; and a cover which is provided with respect to the image taking element so as to hermetically cover at least an effective image taking surface of the image taking element, in which a part, corresponding to the effective image taking surface, of the cover, is made of a transparent member, wherein the cover is moved together with the image taking element.

In the mechanism, the part, corresponding to the effective image taking surface, of the cover, is made of the transparent member or transparent material. That is, the incident light enters the image taking element through the transparent member or material. Therefore, the light incident on the image taking element is not blocked nor hindered by the cover.

According to the mechanism, the cover is provided with respect to the image taking element so as to hermetically cover at least the effective image taking surface of the image taking element. Therefore, even if the foreign matter or dust enters through a gap or space formed in the mechanism for moving or swinging the image taking element, the foreign matter adheres to the surface of the cover, and the foreign matter is prevented from adhering to the effective image taking surface of the image taking element. That is, the surface to which the foreign matter adheres is thus be situated away from the image taking surface of the image taking element. Therefore, the foreign matter becomes tiny and inconspicuous in the image; as a result, it is possible to reduce or diminish the problem that the dust is taken in the image or that the dust is photographed.

The present invention can be embodied as follows.

For example, the transparent member or material can function as a filter to cut infrared rays.

In the mechanism, the function as the filter to cut the infrared rays can be a function as a low-pass filter for preventing any formation of moire. According to the mechanism, the transparent member or material of the cover has the function as the low-pass filter; therefore, the formation of moire is prevented.

In the mechanism, for example, the cover can be closely provided on an image taking surface, including the effective image taking surface, of the image taking element.

In the mechanism, the cover can be in close contact with the image taking surface of the image taking element, by bonding the cover to the image taking surface of the image taking element, or by infiltrating oil between the surface of the cover and the image taking surface of the image taking element.

Alternatively, or in the mechanism, there can be further provided a biasing device for elastically biasing the cover against the image taking surface.

According to the mechanism, with the biasing force exerted by the biasing device, the cover is surely brought into contact with the image taking surface of the image taking element. Also, according to the mechanism, the cover is biased elastically against the image taking surface thereof by the biasing device; therefore, the misalignment (or shift), between the cover and the image taking surface is prevented, when the image taking element is moved or swung. Also, according to the mechanism, since the image taking element and the cover can be in close contact with each other, undesirable phenomena, like that of the Newton's ring on the basis of optical interferences, etc., can be effectively prevented.

Alternatively, the transparent member or material can be kept away from an image taking surface, including the effective image taking surface, of the image taking element by a predetermined distance therebetween.

In the mechanism, the predetermined distance therebetween can be realized, for example, by a structure in which the cover has a shape of a cap, or by sandwiching a transparent sheet between the cover and the image taking element.

According to the mechanism, it is possible to secure the predetermined distance between the cover and the image taking surface of the image taking element, or to secure a longer distance between the surface of the cover and the image taking surface thereof. Therefore, it is possible to make longer or greater the distance between the foreign matter or dust on the surface of the cover and the image taking surface of the image taking element, thus the foreign matter or dust becomes less conspicuous in the image(s).

According to still another aspect of the present invention, there is provided an image taking device comprising: a lens barrel; an image taking element; a circuit board on which the image taking element is mounted; a driver for moving the image taking element and the circuit board with respect to the lens barrel, wherein the image taking element and the circuit board are provided on an end of the lens barrel, in which the image taking element and the circuit board are movable within a surface which is perpendicular to an optical axis, and wherein the driver is provided around the image taking element and is provided in a space between the circuit board and the end of the lens barrel.

In the mechanism, the image taking element, and the circuit board on which the image taking element is mounted, can be arranged on the end of the lens barrel so that the incident light is focussed on the image taking surface of the image taking element.

The performance required of the lens barrel employed for the image taking device using the image taking element, increases as the number of pixels of the image taking element increases. This is because the pitch between the pixels decreases as the number of pixels increases. For this reason, it is necessary to employ a large-diameter lens to improve the optical performance per area, so that the lens barrel diameter tends to be large. Particularly, the diameter of lens barrel, for accommodating lenses with an angle of view narrower than a standard angle of view, tends to be large, in which the correction or compensation of any blur of image to be taken by the image taking element is required. Namely, the space or region around the image taking element increases, and it is possible to arrange the driver for driving the image taking element in the space or region. In the arrangement, the circuit board on which the image taking element is mounted, can be of such a size as covering the image taking element and the driver. Also, in the arrangement, for example, it is possible to divide circuit(s) or element(s) other than the image taking element, such as a circuit for processing signals outputted from the image taking element, and it is possible to mount a counterpart of the circuit(s) or element(s) on another circuit board.

According to the mechanism, the space or region around the image taking element can be effectively employed. Therefore, with the arrangement, it is possible to make the image taking device small and compact in size.

The image taking device can be embodied as follows.

For example, the driver can comprise: a base plate for supporting a first actuator which extends in a first direction, in which the base plate is fixed to the end of the lens barrel; a first slider which slidably engages with the first actuator, in which the first slider is movable in the first direction with respect to the base plate; a second slider for supporting a second actuator which extends in a second direction perpendicular to the first direction, in which the first slider slidably engages with the second actuator, and in which the second slider is movable in the second direction with respect to the first slider, wherein the image taking element is fixed to the second slider.

Alternatively, the driver can comprise: a base plate for supporting a first actuator which extends in a first direction, in which the base plate is fixed to the end of the lens barrel; a first slider which slidably engages with the first actuator, in which the first slider is movable in the first direction with respect to the base plate, and in which the first slider supports a second actuator which extends in a second direction perpendicular to the first direction; a second slider which slidably engages with the second actuator, in which the second slider is movable in the second direction with respect to the first slider, wherein the image taking element is fixed to the second slider.

According to each of the above embodiments or mechanisms, the first slider which engages with the second slider, engages with the base plate so that the first slider can move relative to the base plate in the first direction, and the second slider, to which the image taking element is fixed, can move relative to the first slider in the second direction. That is, by combining the displacements done by the first and second sliders moving in the first and second directions, respectively, a compact driver which is capable of moving the image taking element in two dimensions can be easily realized.

In addition, according to the mechanism, the image taking element is moved by at least the second slider to which the image taking element is fixed, it is possible to make larger in size or area the circuit board on which the image taking element is mounted than at least the second slider.

In the above mechanism, each of the base plate, the first slider and the second slider can be annular in shape, and wherein the second slider is provided in a central space of the first slider and in a central space of the base plate. In the construction, each of the base plate, the first slider and the second slider can be annular, for example, in a shape of a square.

With the mechanism, the dimension in the direction of height of the driver, namely the dimension in the direction of the optical axis of the driver, can be reduced, and the first actuator and second actuator can be arranged around the side of the image taking element.

In the mechanism, preferably, each of the first actuator and the second actuator is an actuator employing at least one piezoelectric element.

According to the mechanism, not only each of the first and second actuators can be constructed compact in size, but also the precision of the control for the driver employing the first and second actuators is significantly enhanced.

BRIEF DESCRIPTION OF THE DRAWINGS

These and other objects and features of the present invention will become clear from the following description taken in conjunction with the preferred embodiment thereof with reference to the accompanying drawings.

DESCRIPTION OF THE PREFERRED EMBODIMENT

Figure 1:
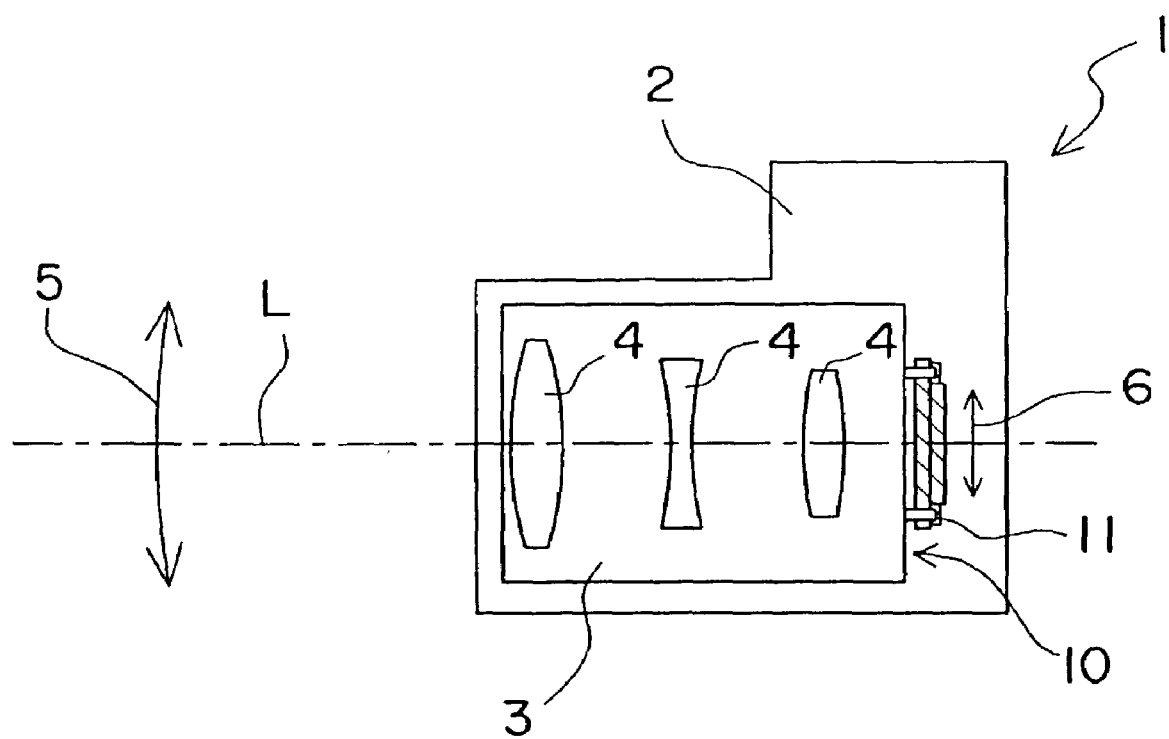
FIG. 1 is a view showing a schematic structure of a digital camera in which an image taking device, according to an embodiment of the present invention, that compensates, or corrects, any possible image blur caused by a vibration of a body of the digital camera, is installed.

Before the description of a preferred embodiment of the present invention proceeds, it is to be noted that like or corresponding parts are designated by like reference numerals throughout the accompanying drawings.

Referring to FIGS. 1 through 13, a description is made below on an image taking device, according to the preferred embodiment of the present invention, that compensates or corrects any possible blur of an image, of an object (or subject) to be photographed, caused by a shaking, or vibration, of a body of a digital camera including the image taking device. That is, in the embodiment, the image taking device 10 applies to the digital camera 1, as shown in FIG. 1.

The digital camera 1 has a camera body 2 and the image taking device 10 housed in the camera body 2. The image taking device 10 has a lens barrel or a lens barrel body 3 which has an optical system including a plurality of lenses 4 etc., and a driver or a drive mechanism 11 that allows an image taking element to be arranged movably at one end of the lens barrel 3. The image taking device 10 is mounted on the one end of the lens barrel 3. As described later, the image taking device 10 is provided with the image taking element such as a CCD. When the camera body 2 of the digital camera 1 shakes, or moves, or vibrates, during shooting or photographing the object, and when the optical axis L of the light incident on the lens barrel 3 shifts, or swerves, as shown by an arrow 5 of FIG. 1, the image taking element is moved, or swung, in a direction as shown by an arrow 6 in the figure, so as to correct, or compensate, the shift or swerve of the optical axis.

Figure 2:
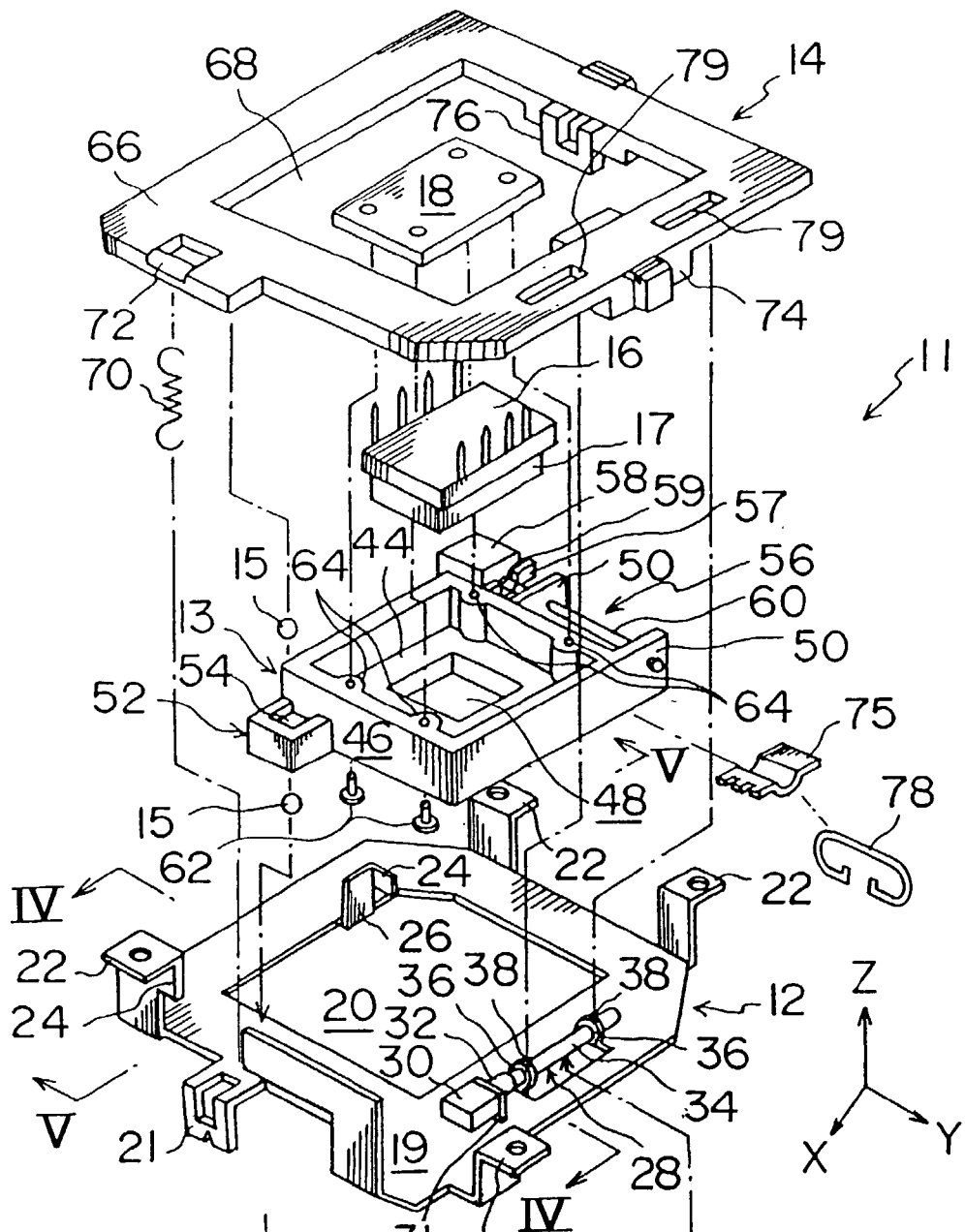
FIG. 2 is an exploded perspective view of a drive mechanism, or a driver, of the image taking device of FIG. 1.
Figure 3:
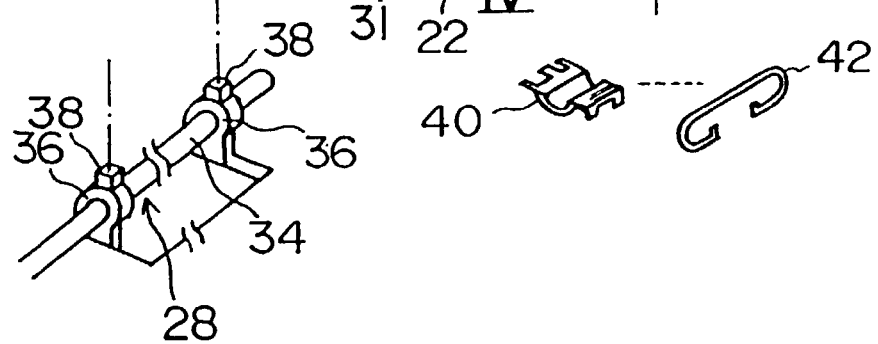
FIG. 3 is a detailed perspective view showing a part of first linear actuator of the drive mechanism of FIG. 2.
Figure 4:
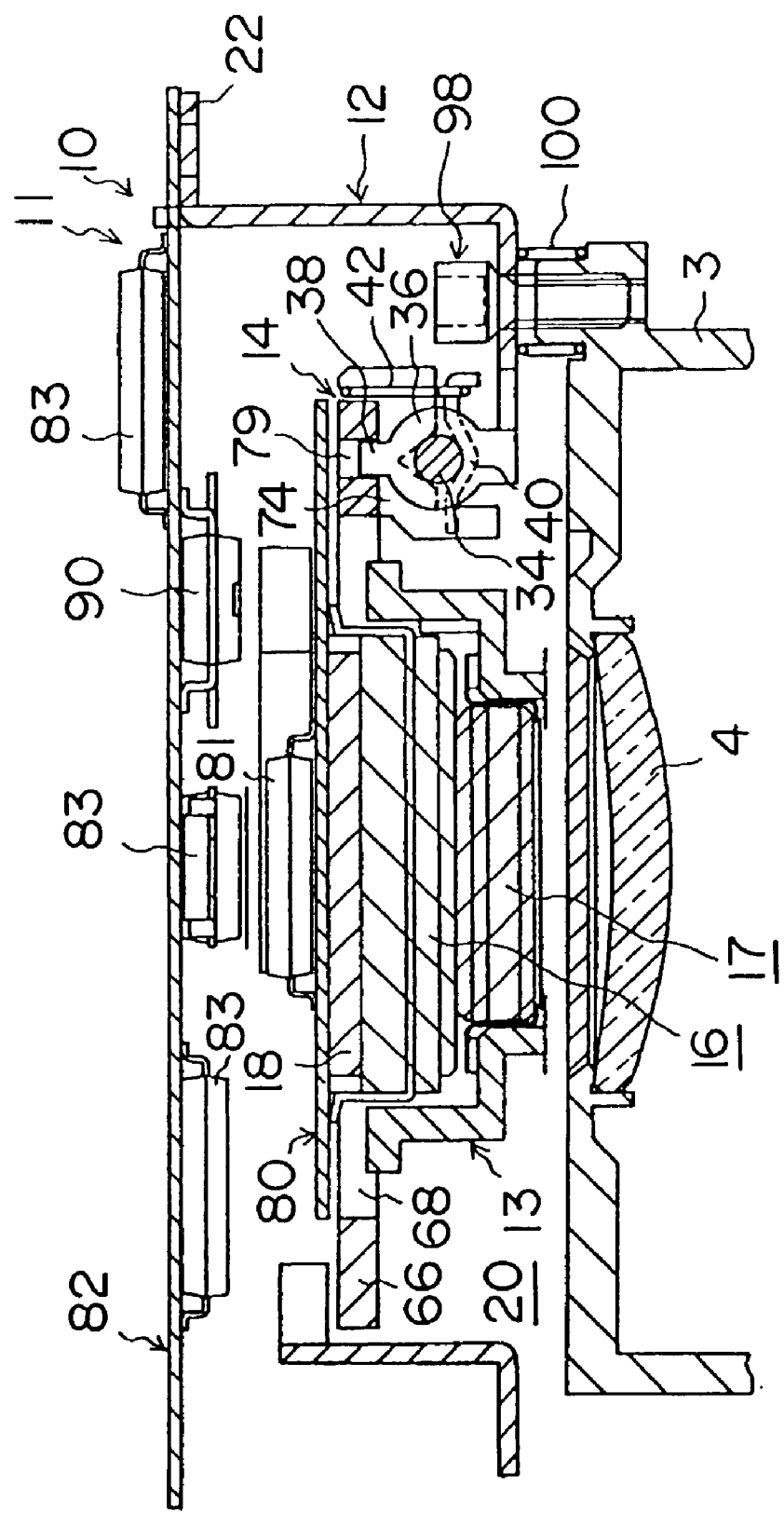
FIG. 4 is a cross-sectional view of a main part of the image taking device approximately taken on a line corresponding with IV-IV in FIG. 2.
Figure 5:
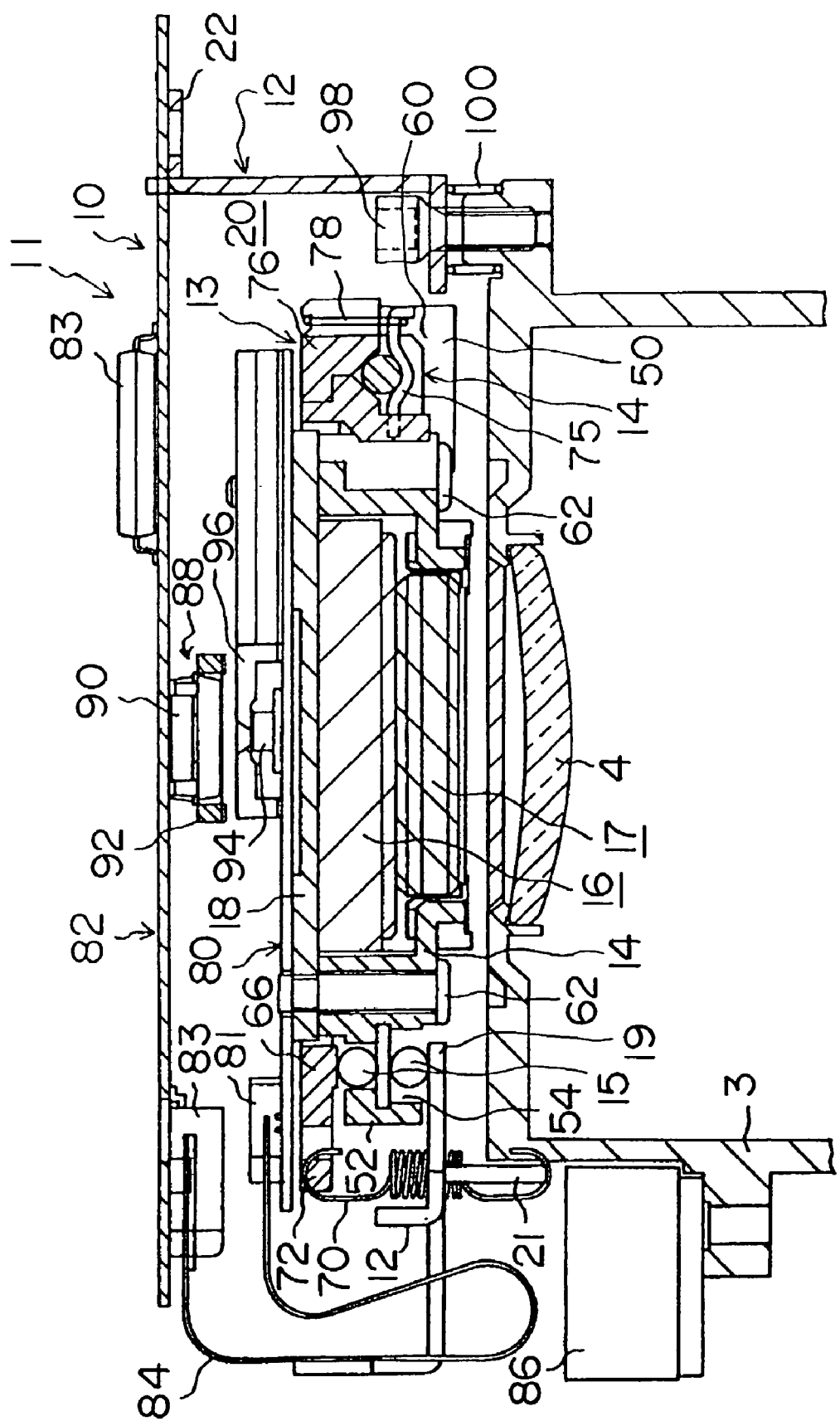
FIG. 5 is a cross-sectional view of a main part of the image taking device approximately taken on a line corresponding with V-V in FIG. 2.

FIG. 2 is an exploded perspective view of the driver (or drive mechanism) of the image taking device of FIG. 1; FIG. 3 is a detailed perspective view showing a part of a first linear actuator of the driver of FIG. 2; FIG. 4 is a cross-sectional view of a main part of the image taking device approximately taken on a line corresponding with IV-IV in FIG. 2; and FIG. 5 is a cross-sectional view of a main part of the image taking device approximately taken on a line corresponding with V-V in FIG. 2, in which the driver is fixed to the lens barrel 3. The driver 11 has a base plate 12, a first slider 14 that moves in the horizontal direction (hereinafter, referred to as X-axis direction) with respect to the base plate 12, a second slider 13 that moves in a direction perpendicular to the direction of movement of the first slider (hereinafter, referred to as Y-axis direction), and the image taking element 16 which is fixed to the second slider 13.

The base plate 12 is fixed to the lens barrel 3 under a condition in which the position of the base plate 12 is adjusted relative to the lens barrel 3 in respect of tilt of the former to the latter, as shown in FIGS. 4 and 5, and the distance between the lens barrel 3 and the driver 11 can be adjusted with a screw 98 and a spring 100. The base plate 12 has an annular metal frame 19 which extends perpendicular to the direction of the optical axis (hereinafter, referred to as Z-axis direction) and which has a large hole 20 in the central part thereof.

From the base plate 12, various arms (for example, a pressure spring latch 21, a board holding arm 22, a float preventing claw 24, a positioning arm 31, a rod holding arm 36) extend in the direction of the optical axis (i.e. in the Z-axis direction). A first linear actuator 28 which has a piezoelectric element 32 sandwiched between a vibration transmitting rod 34 and a weight 30, is fixed to the metal frame 19, in the X-axis direction.

The first linear actuator 28 has the following construction. Namely, one end of the vibration transmitting rod 34 on the side of the piezoelectric element 32, and the other end thereof, are engaged with a pair of the rod holding arms 36 fixed on the base plate 12. With the weight 30 abutting, or contacting, the positioning arm 31 of the base plate 12, the vibration transmitting rod 34 at the two locations, or positions, of engagements with the pair of rod holding arms 36, and the weight 30, are bonded, or adhered, to the base plate 12. In order to bond the rod holding arms 36 and the vibration transmitting rod 34 to each other, an adhesive that has resilience (or resiliency) after it is cured, such as a silicone adhesive, can be suitably used. On the other hand, in order to bond the positioning arm 31 and the weight 30 to each other, a soft rubber adhesive, or a silicone-containing adhesive, can be suitably used.

Each of the two rod holding arms 36 of the base plate 12 has a protrusion or projecting part 38 which extends in the Z-axis direction. The protrusions 38, 38 are, respectively, engaged with the corresponding movement limiting holes 79, 79 formed in the first slider 14, upon assemblage, as described later.

The first slider 14 is situated, or positioned, on the image formed surface side with respect to the base plate 12 in the direction of the optical axis (i.e. in the Z-axis direction). The first slider 14 has an annular frame 66, made of aluminum, which has an opening 68 for housing the second slider 13, substantially within the same plane of the first slider 14. The first slider 14 has a first rod abutment portion (or a first rod contacting portion) 74 which abuts or contacts the vibration transmitting rod 34 of the first linear actuator 28 fixed to the base plate 12, a second rod abutment portion (or a second rod contacting portion) 76 which abuts or contacts a vibration transmitting rod 60 of a second linear actuator 56 fixed to the second slider 13, a pressure spring latch 72 for latching, or locking, a pressure spring 70 extending between the pressure spring latch 21 of the base plate 12 and the first slider 14, and a movement limiting hole 79.

As shown in FIG. 4, the first slider 14 is biased towards the base plate 12 by the pressure spring 70 which is mounted between the pressure spring latch 21 of the base plate 12 and the pressure spring latch 72 of the first slider 14, so as to approach the base plate 12. With the arrangement, the first slider 14 is prevented from rotating about the vibration transmitting rod 34.

Figure 6:
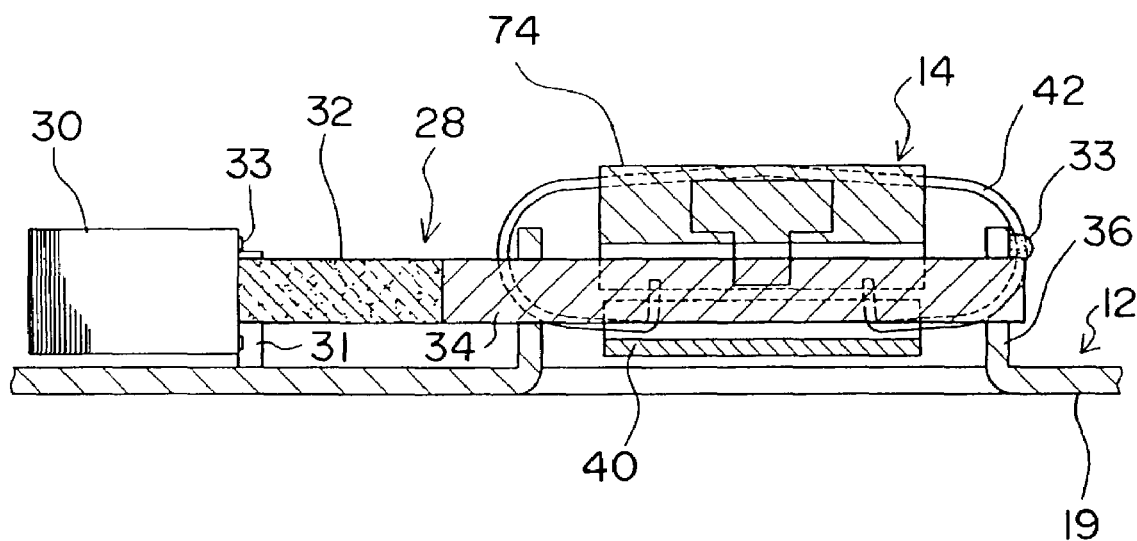
FIG. 6 is a partially cross-sectional view showing an engagement of the first linear actuator with a first slider.

The first rod abutment portion 74 has a V-shaped groove in cross section (see FIG. 4). With the vibration transmitting rod 34 of the actuator 28 contacting the V-shaped groove, the vibration transmitting rod 34 is sandwiched between the V-shaped groove and a cap 40. That is, the first rod abutment portion 74 is frictionally coupled to the vibration transmitting rod 34 so as to be slidable along the vibration transmitting rod 34. To fix the first rod abutment portion 74 and the cap 40 to each other, a holding spring 42 is employed. FIG. 6 is a structural view of the first linear actuator 28 with which the first slider 14 is frictionally engaged. As described above, the first linear actuator 28 has the construction in which the piezoelectric element 32 is sandwiched between the vibration transmitting rod 34 and the weight 30, and the actuator 28 is engaged with the pair of rod holding arms 36 and the positioning arm 31 of the base plate 12. In the arrangement, in order to prevent any backlash therebetween, they are bonded to each other with an adhesive 33, as aforementioned.

Figure 7:
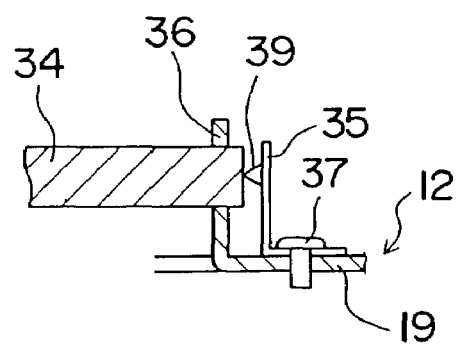
FIG. 7 is a view showing a structure according to a modification to that of the first linear actuator.

As a modification to the connection structure between the first linear actuator 28 and the base plate 12, a plate spring as shown in FIG. 7, can be employed. That is, a plate spring 35 bent in an L shape is fixed onto the base plate 12 so as to be situated at an end of the vibration transmitting rod 34 so that a sharp-pointed projection 39 formed on the plate spring 35 sticks into the end of the vibration transmitting rod 34. The plate spring 35 biases, or pushes, the vibration transmitting rod 34 toward the piezoelectric element 32 by its resilience all the time. By the construction, the rod 34 is free of backlash and can vibrate against the resilience.

Above the vibration transmitting rod 34 of the first linear actuator 28, the first slider 14 is disposed. The first slider 14 is frictionally coupled to the vibration transmitting rod 34 with the construction in which the vibration transmitting rod 34 is sandwiched between the first rod abutment portion 74 and the cap 40, as aforementioned. To fix the first rod abutment portion 74 and the cap 40 together, the holding spring 42 is employed. Namely, one end of the cap 40 is latched, or locked, with the first rod abutment portion 74, a central part of the cap 40 abuts or contacts the vibration transmitting rod 34, and the other end of the cap 40 is pulled by the holding spring 42. The contact pressure exerting between the cap 40 and the vibration transmitting rod 34 is approximately twice the pulling pressure of the holding spring 42.

The holding spring 42 is elliptical in shape, and its ends thereof are situated in the central part of the single linear part. The holding spring 42 is bridged between the cap 40 and the first slider 14 so that the ends of the holding spring 42 engage a hook part of the cap 40 and so that the linear central part of the holding spring 42 engage a hook part of the first rod abutment portion 74. With the arrangement, the cap 40 and the first slider 14 are fixed to each other.

The movement limiting holes 79 are loosely engaged with the protrusions 38 provided on the upper surfaces of the rod holding arms 36 of the above-described base plate 12. Each of the pair of movement limiting holes 79 is an elongate hole having a length corresponding to the range of movement of the first slider 14 with respect to the base plate 12. The each thereof extends in the direction of movement of the first slider 14 with respect thereto, that is, in the direction of extension of the vibration transiting rod 34 (X-axis direction). The pair of movement limiting holes 79 engage the protrusions 38 on the upper surfaces of the rod holding arms 36 of the base plate 12. With the construction, the movement (drop) of the first slider 14 in the direction of the short sides of the movement limiting holes 79 (Y-axis direction), is restricted or limited.

Figure 8:
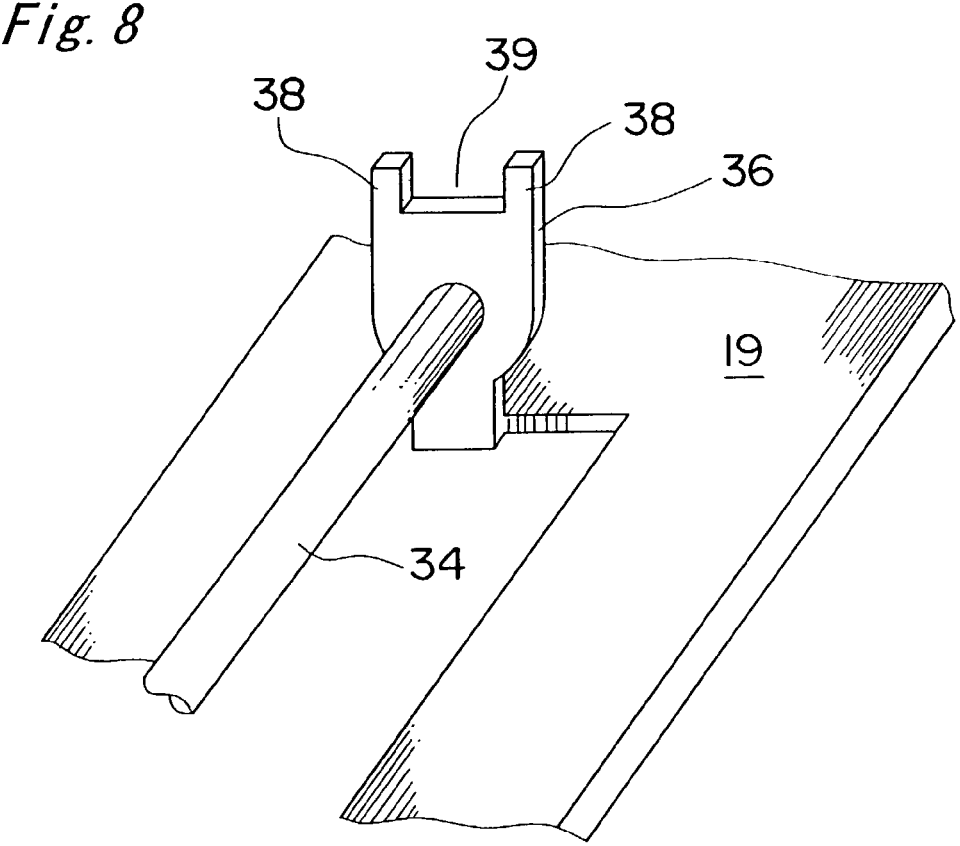
FIG. 8 is a perspective view showing an engagement structure, according to a modification, between a rod holding arm and the first slider.
Figure 9:
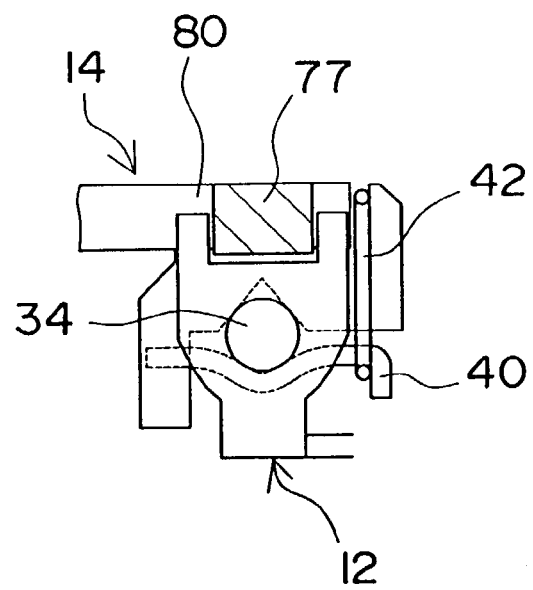
FIG. 9 is a cross-sectional view showing the engagement structure of FIG. 8.

FIGS. 8 and 9 show a modification to the construction in which the rod holding arm and the first slider are engaged with each other. In this modification, a belt-like protrusion 77 extending in the direction of movement of the first slider 14, that is, in the direction of extension of the vibration transmitting rod 34 (i.e. in the X-axis direction), is provided on the surface of the first slider 14 opposed to the base plate 12. As shown in FIG. 8, each of the rod holding arms 36 has a pair of protrusions 38, 38 provided at the ends of the upper surface thereof and has a concave portion 39 formed between the pair of protrusions 38, 38, so as to form a fork. In the construction, the belt-like protrusion 77 engages the concave portion 39 so that the protrusion 77 is sandwiched between the pair of protrusions 38, 38. When the first rod abutment portion 74 of the first slider 14 is frictionally coupled to the vibration transmitting rod 34 by the cap 40, the concave portion 39 of the fork is fitted to the belt-like protrusion 77 of the first slider 14.

The second slider 13 is a box-shaped body which is made of resin and which has an opening 48 formed in the bottom wall 44, and it holds the image taking element 16, a heat radiating plate 18, a low-pass filter 17 and a second linear actuator 56. The heat radiating plate 18 abuts the back surface of the image taking element 16 where the image pickup surface (or image taking surface) thereof is not provided. The heat radiating plate 18 is fixed to the second slider 13, by screws 62 which pass through screw fixing holes 64 formed in the second slider 13, so as to cover the space defined by the peripheral wall 46 of the second slider 13. As shown in FIGS. 4 and 5, a first circuit board 80 is mounted on the back surface of the heat radiating plate 18, and the image taking element 16 is disposed on the circuit board 80. As shown in FIGS. 4 and 5, on the back surface of the first circuit board 80, are mounted a red LED 94 for detecting the position of the second slider 13, an image taking element driver, a preamplifier and a color separation circuit for processing photoelectric signals outputted from the image taking element 16, a white balance adjustment circuit, and part of an element (output circuit) 81 associated with reading of image signals outputted from the image taking element 16 such as an analog processing circuit.

As shown in FIGS. 2, 4 and 5, the low-pass filter 17 is closely attached to the image taking element 16 so as to cover the effective image pickup surface (or effective image taking surface) of the image taking element 16, and the low-pass filter 17 is fitted in the opening 48 of the second slider 13. In the arrangement, the low-pass filter 17 is pushed, or biased, against the image taking element 16 by a close contact spring which is arranged around the opening 48, and the back surface of the image taking element 16 is in close contact with the heat radiating plate 18. Consequently, the effective image pickup surface of the image taking element 16 is always in close contact with the low-pass filter 17.

On the other hand, a pair of rod holding arms 50 are provided on a side of the peripheral wall 46 of the second slider 13, and the second actuator 56 is bonded to, and is held by, the rod holding arms 50, 50. That is, one end of the vibration transmitting rod 60, and the other end (on the side of a piezoelectric element 59) thereof, are engaged with the rod holding arms 50, 50 of the second slider 13, respectively, and the two positions of engagement of the vibration transmitting rod 60 and a weight 58 are bonded to the second slider 13.

Like the aforementioned bond employed for the first actuator 28, in order to bond the vibration transmitting rod 60 to the rod holding arms 50 and 50, an adhesive that has resiliency after it is cured, such as a silicone adhesive, is preferably employed, and in order to bond the weight 58 thereto, a soft rubber adhesive or a silicone-containing adhesive is preferably employed.

The second linear actuator 56 of the second slider 13 is sandwiched between the second rod abutment portion 76 of the first slider 14 and a cap 75, so that the first slider 14 is frictionally coupled to the second slider 13. In order to fix the second rod abutment portion 76 and the cap 75 to each other, a sandwiching spring (or holding spring) 78 is employed. One end of the cap 75 is locked by the second rod abutment portion 76, a central part of the cap 75 contacts, or abuts, the vibration transmitting rod 60, and the other end of the cap 75 is pulled by the holding spring 78. The contact pressure exerting between the cap 75 and the vibration transmitting rod 60 is approximately twice the pulling pressure of the holding spring 78.

The holding spring 78 is elliptical in shape, like that employed for the first linear actuator 28, and its ends thereof are situated in the central part of the single linear part. The holding spring 78 is bridged between the cap 75 and the first slider 14 so that the ends of the holding spring 78 engage a hook part of the cap 75 and so that the linear central part of the holding spring 78 engage a hook part of the second rod abutment portion 76. With the arrangement, the cap 75 and the first slider 14 are fixed to each other.

The second linear actuator 56 of the second slider 13 has two pairs of facing (or opposing) peripheral parts which constitute the peripheral wall 46, and a direction reference plate 52 is mounted on a peripheral part which is opposite to a peripheral part on which side the vibration transmitting rod 60 is arranged. The direction reference plate 52 has a pair of rigid ball receivers 54 in the form of concave parts on its front side and its rear side, each of which receives, or holds, a rigid ball 15 as shown in FIG. 2. The direction reference plate 52 is mounted so as to be sandwiched between the first slider 14 and the base plate 12 through the pair of rigid balls 15 and 15, with each of the rigid balls 15 being loosely fitted inside the concave part of the rigid ball receiver 54.

The pressure spring 70 is mounted between the first slider 14 and the base plate 12, as described above. With the arrangement, the second slider 13 is prevented from rotating about the vibration transmitting rod 60 of the second linear actuator 56.

Upon assembling the base plate 12 and the first slider 14 to each other, the first slider 14 is positioned with respect to the base plate 12 so that the first slider 14 is disposed within an area which is surrounded by the four board holding arms 22 provided on the base plate 12. In order to prevent the first slider 14 from floating from a base of the annular metal frame 19, the upper end or surface thereof is locked by the float preventing claws 24 provided on the base plate 12.

On the other hand, the second slider 13 is assembled to the first slider 14 so that the box-shaped body of the former 13 is fitted in the opening 68 of the latter 14. The second slider 13 is integrally structured to the first slider 14 so as to hang from the first slider 14. As described above, the first slider 14 is slidable in the X-axis direction along the first actuator 28. At this time, the second slider 13 also integrally moves with the first slider 14, and the image taking element 16 fixed to the second slider 13 also moves in the X-axis direction. Meanwhile, the second slider 13 is independently movable in the Y-axis direction with respect to the first slider 14. At this time, with respect to the base plate 12, the second slider 13 also moves in the Y-axis direction when the first slider 14 does not move with respect to the base plate 12. Consequently, at this time, the image taking element 16 which is fixed to the second slider 13, also moves in the Y-axis direction.

Next, a second circuit board 82 is fixed to the board holding arms 22 of the base plate 12, with the first and second sliders 14 and 13 being assembled to each other. Since the first circuit board 80 is fixed to the second slider 13 as described above, both of them are superimposed, or overlapped, in the direction of the optical axis. In the arrangement, the first circuit board 80 moves in parallel with the second circuit board 82, as the second slider 13 moves. The first and second circuit boards 80 and 82 are connected by a flexible circuit board 84, so that it is possible to transmit and receive signals between the first and second circuit boards 80 and 82.

The flexible circuit board 84 is arranged as follows. That is, immediately after jutting, or extending, from the first circuit board 80 in the horizontal direction, the flexible circuit board 84 is bent approximately in the direction of the optical axis (i.e. in the Z-axis direction) and is connected to the second circuit board 82, as shown in FIG. 5.

On the second circuit board 82, the following circuits and components are mounted. Namely, on the second circuit board 82, there are mounted a circuit 83 for processing signals outputted from the image taking element 16 (i.e. from the first circuit board 80) such as an AD converter and a memory controller, a position detection element or component 88 (hereinafter, referred to as PSD) for detecting or sensing the position of the second slider 13, and a movement control circuit for controlling the movements of the two linear actuators on the basis of the positional signal(s) outputted from the PSD 88 and on the basis of the angular speed signal(s) outputted from a gyro circuit 86. In order to prevent error(s) in detection, the PSD 88 is covered with a cover 92 having a slit, and a light receiving element 90 which receives light emitted from the red LED 94 provided on the first circuit board 80, detects the position of the second slider 13. Signals of angular speeds in the perpendicular directions to be detected, namely in the X-axis and the Y-axis directions, are inputted to the second circuit board 82 from the gyro circuit 86. Also, a linear actuator control signal and a processed image signal, are outputted from the second circuit board 82.

The base plate 12 as a mechanism for supporting and moving/swinging the image taking element 16, the first slider 14, and the second slider 13, are assembled to each other so as to fit one another. The base plate 12, the first slider 14, and the second slider 13, are positioned around the image taking element 16 and the first circuit board 80 directly connected to the image taking element 16, and they are positioned upstream in the direction of the optical axis with respect to the image taking element 16 and the first circuit board 80.

That is, as shown in FIGS. 4 and 5, when the driver (or drive mechanism) 11 is assembled, or mounted, to the lens barrel 3, the mechanism for supporting and swinging the image taking element 16 is efficiently arranged so as to fill any superfluous space with respect to the outline of the members and components which are necessary for constituting the optical system including the lens barrel 3 and the image taking element 16, thus making the optical unit small and compact.

Next, it is explained about how the image taking device according to the preferred embodiment operates, below.

Figure 10:
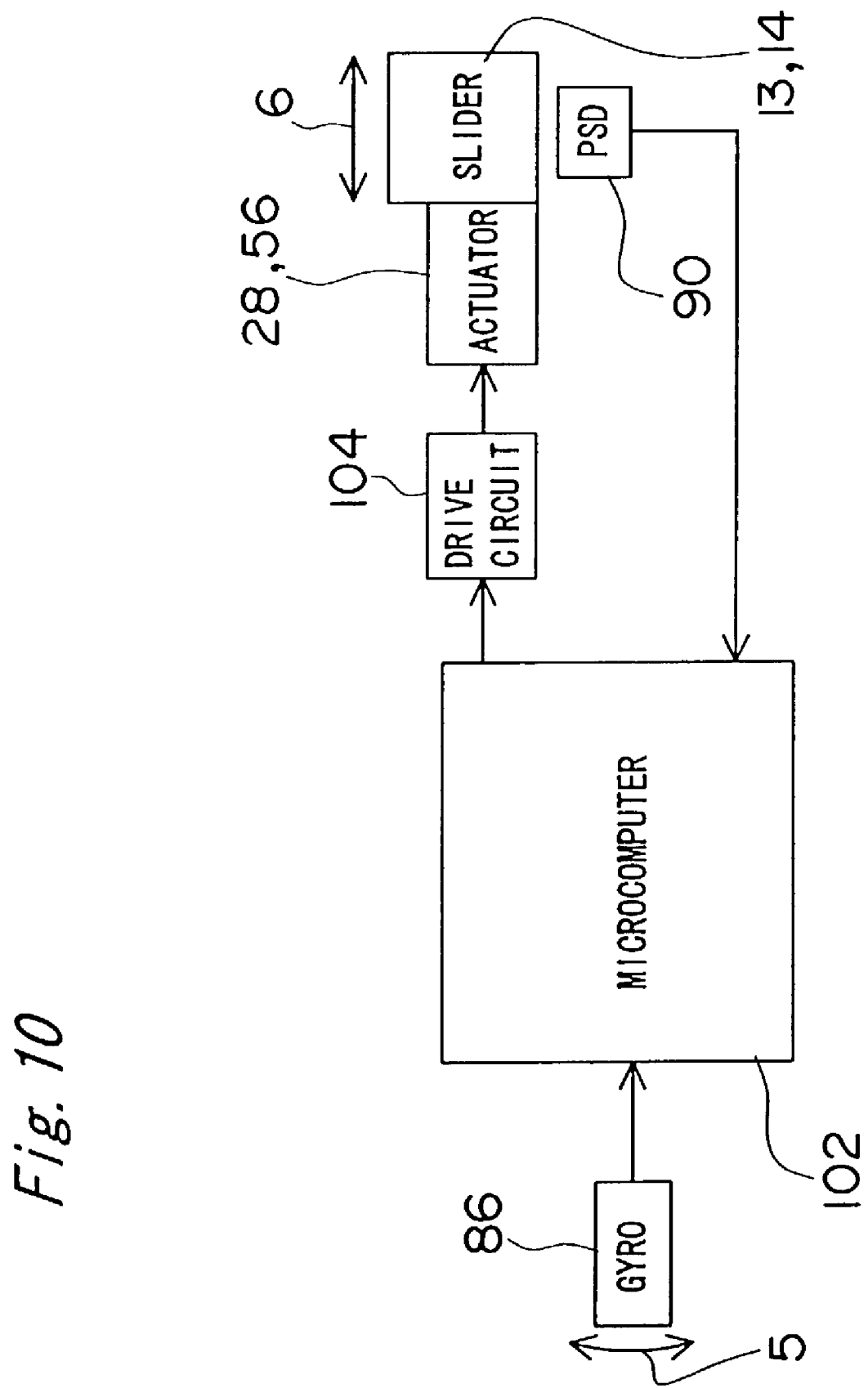
FIG. 10 is a block diagram showing a drive control circuit of the drive mechanism of FIG. 2.

Namely, FIG. 10 is a block diagram showing a drive control circuit for controlling the image taking device 10. The drive control circuit includes: the gyro circuit 86 for detecting a shift or swing 5 of the optical axis L of the light entering into the lens barrel 3 and for outputting an angular speed signal, a PSD circuit 90 for detecting the position of the second slider 13 (or the position of the image taking element 16), a microcomputer 102 for performing an overall control of the circuits and for calculating the amount of movement and the position thereof on the basis of the inputted signal(s), and a drive circuit 104 for generating a drive pulse having a predetermined frequency on the basis of the drive signal(s) outputted from the microcomputer 102. The drive pulse(s) generated by the drive circuit 104 is/are outputted to the first linear actuator 28 and the second linear actuator 56, and the first slider 14 and the second slider 13, respectively, move along the linear actuators 28 and 56.

The gyro circuit 86 is fixed to the lens barrel 3 as shown in FIG. 5. When the camera body moves, or shakes, or vibrates, as shown by the arrow 5 in FIGS. 1 and 10, the gyro circuit 86 detects the angular speed(s) in two axis directions (i.e. in the X-axis direction and the Y-axis direction), and it outputs the corresponding signal(s) to the microcomputer 102.

When the angular speed signal(s) is/are inputted from the gyro circuit 86 to the microcomputer 102, the microcomputer 102 calculates the amount and speed of movement of the image on the basis of blur of the image which forms on the image taking element (i.e. on the image formed surface) 16 from a signal representative of the focal length of the optical system. From the calculated speed of movement and from the position of the second slider 13 (i.e. the position of the image taking element 16), a supply voltage having a predetermined frequency to be applied to each of the two linear actuators 28 and 56 are determined. That is, from the position of the second slider 13 (or the image taking element 16) calculated on the basis of signal(s) outputted from the PSD 90, and from the angular speed signal(s) outputted from the gyro circuit 86, the microcomputer 102 calculates a theoretical position where the image taking element 16 should be, the microcomputer 102 compares the theoretical position with the present actual position thereof, and the microcomputer 102 performs a feedback control for moving the first slider 14 and the second slider 13 so as to move the image taking element 16 to the theoretical position.

The drive circuit 104 receives a signal from the microcomputer 102, and it outputs a drive pulse having a frequency which corresponds approximately to 70 percent of the resonance frequency of the linear actuators 28 and 56. The drive pulse is supplied to the piezoelectric elements 32 and 59, and the first and second sliders 14 and 13 are driven to move along the vibration transmitting rods 34 and 60, according to the principle described below.

Figure 11:
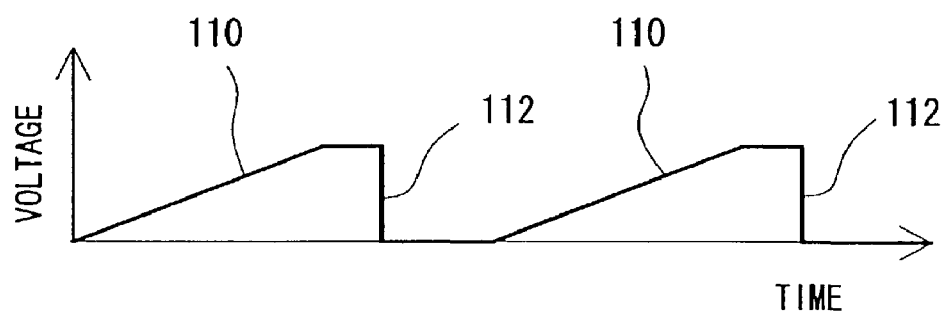
FIG. 11 is a view for explaining a principle of how to drive the actuator, showing an example of waveform of a drive pulse applied to a piezoelectric element.
Figure 12:
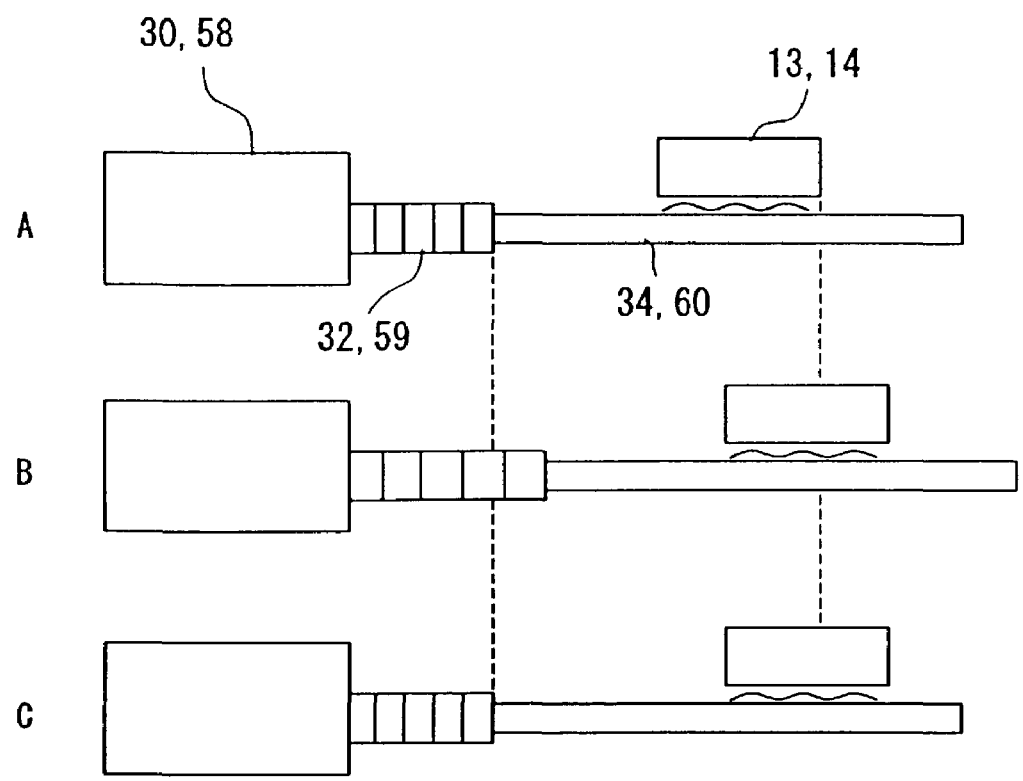
FIGS. 12(A) to 12(C) are views for explaining how the linear actuator moves or operates.

When a saw-teeth-shaped drive pulse having a gently rising part (or a gently ascending part) 110 and a steeply falling part (or a steeply descending part) 112, as shown in FIG. 11, is applied to the piezoelectric elements 32 (59), the actuator 28 (56) operates as follows.

Namely, while the pulse, or voltage, having the gently rising part 110 is supplied to the piezoelectric element 32 (59), the piezoelectric element 32 (59) expands slowly in the axial direction of thickness of the piezoelectric element 32 (59), as shown in FIGS. 12(A) and 12(B), and the vibration transmitting rod 34 (60) which is fixed to the piezoelectric element 32 (59) is slowly displaced in the axial direction. At this time, the slider 14 (13) frictionally coupled to the vibration transiting rod 34 (60) moves together with the vibration transmitting rod 34 (60) by a frictional force exerting therebetween.

On the other hand, while the pulse, or voltage, having the steeply falling part 112 is supplied to the piezoelectric element 32 (59), the piezoelectric element 32 (59) contracts rapidly, or suddenly, in the axial direction of thickness of the piezoelectric element 32 (59), and the vibration transmitting rod 34 (60) which is fixed to the piezoelectric element 32 (59) is also rapidly, or suddenly, displaced in the axial direction. At this time, as shown in FIG. 12(C), the slider 14 (13) which is frictionally coupled to the vibration transmitting rod 34 (60), slides over the vibration transiting rod 34 (60) by overcoming the frictional force exerting therebetween due to its inertial force, and the slider 14 (13) substantially remains at the same position with respect to the weight 30 (58). As a result, the slider 14 (13) moves rightward along the vibration transmitting rods 34 (60) from the initial position shown in FIG. 12(A).

By continuously applying the drive pulse of the waveform having the saw-teeth shape to the piezoelectric elements 32 (59), the slider 14 (13) can be continuously moved in the axial direction.

Incidentally, the situation of the above expression that "the slider 14 (13) substantially remains at the same position", includes the following situation. Namely, the situation is that the slider 14 (13) slides against (or over) the vibration transmitting rod 34 (60) by an absolute length of "A" with respect to the rod 34 (60) when the piezoelectric element 32 (59) expands, that the slider 14 (13) also slides against (or over) the vibration transmitting rod 34 (60) by an absolute length of "B" with respect to the rod 34 (60) when the piezoelectric element 32 (59) contracts, that the absolute length of "A" is not equal to the absolute length of "B", and that the slider 14 (13), as a whole, slides against (or over) the vibration transmitting rod 34 (60) by a distance which is equal to the difference between the absolute lengths of "A" and "B".

By the way, in order to move the slider 14 (13) leftward with respect to the vibration transmitting rod 34 (60) (therefore, with respect to the weight 30 (58)) in FIGS. 12(A), 12(B), 12(c), such a drive pulse with a waveform of a sawteeth shape which has a steeply rising part and a gently falling part is applied to the piezoelectric elements 32 (59). As the drive pulse, a pulse having a rectangular-shaped waveform or a pulse having other types of waveforms, can be applied.

When the drive pulse is applied to the piezoelectric element 32 of the first linear actuator 28 which is held by the base plate 12, the piezoelectric element 32 repeatedly expands and contracts, as described above. The expansion and contraction of the piezoelectric element 32 is transmitted to the weight 30 and the vibration transmitting rod 34. The weight 30 hardly moves or shakes because of the difference in inertial mass between the weight 30 and the vibration transmitting rod 34, and the expansion and contraction thereof is transmitted only to the vibration transmitting rod 34. Although the vibration transmitting rod 34 is bonded to each of the rod holding arms 36 and 36 as described above, the expansion and contraction of the piezoelectric element 32 is not interfered nor blocked, because the bond or adhesive 33 for bonding the vibration transmitting rod 34 to each of the rod holding arms 36 and 36 is resiliently deformed.

As explained above, when there exists a difference in absolute speeds of the vibration transmitting rod 34 which moves rightward and leftward in the X-axis direction, and when the piezoelectric element 32 continuously expands and contracts with such a difference in absolute speeds thereof, the first slider 14 frictionally connecting with the vibration transmitting rod 34, as a whole, slidably moves rightward or leftward over the vibration transmitting rod 34 in the X-axis direction.

When the first slider 14 is accelerated or decelerated along the vibration transmitting rod 34 in the X-axis direction, such a possible force as making the vibration transmitting rod 34 move in a backlash with respect to the rod holding arm 36 in the first linear actuator 28 may be exerted therein. However, the vibration transmitting rod 34 and the rod holding arms 36 are bonded together, as aforementioned. Therefore, the vibration transmitting rod 34 moves with respect to the rod holding arm 36, without backlash caused therebetween. Thus, not only degradation in correction performance (or in compensation performance), but also degradation in optical performance due to a focal point shift, can be effectively prevented.

When the first slider 14 moves in the X-axis direction, the second slider 13 coupled to the first slider 14 simultaneously moves in the X-axis direction. The second slider 13 is moved with little resistance acting thereon and without shifting in the direction of the optical axis, by the pressure spring 70 provided between the first slider 14 and the base plate 12, and by the rigid ball 15 arranged between the second slider 13 and the base plate 12. Upon the movement thereof, the angle of opening at which the flexible circuit board 84 connecting the first and second circuit boards 80 and 82 is bent, varies to absorb the movement of the first slider 14.

When the drive pulse is applied to the piezoelectric element 59 of the second linear actuator 56 held by the second slider 13, the piezoelectric element 59 repeatedly expands and contracts, as described above. The expansion and contraction of the piezoelectric element 59 is transmitted to the weight 58 and the vibration transmitting rod 60. The weight 58 hardly moves because of the difference in inertial mass between the weight 58 and the vibration transmitting rod 60, and the expansion and contraction is transmitted only to the vibration transmitting rod 60. The vibration transmitting rod 60 is bonded to the rod holding arms 50, 50 of the second slider 13 by a bond or adhesive which has elasticity, and the adhesive is resiliently deformed. Therefore, the expansion and contraction of the piezoelectric element 59 is not hindered nor blocked by the adhesive.

According to the same principle of operation as that of the aforementioned first linear actuator 28, due to the difference in speed between the expansion and contraction of the piezoelectric element 59 in the Y-axis direction, the second slider 13 moves, or runs, on its own, relatively, with respect to the first slider 14.

When the second slider 13 is accelerated or decelerated along the vibration transmitting rod 60 in the Y-axis direction, such a possible force as making the vibration transmitting rod 60 move in a backlash with respect to the rod holding arm 50 in the second linear actuator 56 may be exerted therein. However, the vibration transmitting rod 60 and the rod holding arms 50 and 50 are bonded together by the particular type of adhesive or bond, as aforementioned. Therefore, the vibration transmitting rod 60 moves with respect to the rod holding arm 50, without any backlash caused therebetween. Thus, not only degradation in correction performance (or in compensation performance), but also degradation in optical performance due to a focal point shift, can be effectively prevented.

When the drive pulse is applied to piezoelectric element 59 of the second linear actuator 56, the second slider 13 moves (by itself) in the Y-axis direction independently with respect to the first slider 14. The second slider 13 is moved with little resistance acting thereon and without shifting in the direction of the optical axis, by the pressure spring 70 provided between the first slider 14 and the base plate 12, and by the rigid ball 15 arranged between the second slider 13 and the first slider 44. Upon the movement thereof, the bent part of the flexible circuit board 84 connecting the first and second circuit boards 80 and 82 is twisted to absorb the movement of the second slider 13.

As apparent from the above explanation, when both of the first linear actuator 28 and the second linear actuator 56 operate or work, the image taking element 16 is moved with respect to the base plate 12, in accordance with the composition of the distance (or displacement) of movement of the first slider 14 in the X-axis direction relative to the base plate 12 and the distance (or displacement) of movement of the second slider 13 in the Y-axis direction relative to the first slider 14.

According to the mechanism of the preferred embodiment, the image taking element 16 can move in the X-axis direction and the Y-axis direction, by driving the first and second linear actuators 28 and 56 so that any image blur due to shake, or movement, or vibration, of the camera body detected by the gyro circuit 86 is corrected or compensated.

Moreover, since the circuit board for processing signals outputted from the image taking element 16, is divided into two sub-boards, and the role in the process of the signals are divided thereby, the size of the first circuit board 80 on which the image taking element 16 is mounted can be reduced. In other words, the space involved in the movement of the image taking element 16 can be reduced significantly, and therefore the overall size of the digital camera 1 having the image taking device 10 can be reduced.

In addition, since the image taking element 16 is directly connected to the circuit board for processing the signals outputted from the image taking element 16, noise can be reduced.

In addition, since the first and second circuit boards 80 and 82 are overlapped, or superimposed, one over the other in the direction of the optical axis, the position of the first circuit board 80, that is, the position of the image taking element 16, can be easily determined by use of the position relative to the second circuit board 82. Also, by arranging the element(s) or component(s) for detecting the relative position therebetween directly on the first and second circuit boards 80 and 82, the size of the digital camera can be further reduced, and necessary members and components can be arranged efficiently in a smaller space.

Moreover, since a part of the load (for example, the components or elements) on the first circuit board that moves together with the image taking element 16, is distributed to the second circuit board which is stationary, it is possible to reduce the scale and weight of the movable first circuit board. Namely, this enables reduction in weight of the movable part(s), and it is possible to maintain high resonance frequency of the digital camera. Therefore, the control of movement of the image taking element by the actuators employing the piezoelectric element can be easily performed.

According to the preferred embodiment, the image taking element 16 and the low-pass filter 17 are fixed to the second slider 13 in a state in which the image taking element 16 and the low-pass filter 17 are in close contact with each other, and the low-pass filter 17 is pushed, or biased, against the image taking element 16. Therefore, adherance of foreign matter, or dust, to the effective image pickup surface (or effective image taking surface) of the image taking element 16, is prevented.

Meanwhile, there is a possibility that the foreign matter, or dust, may adhere to the surface of the low-pass filter 17. However, the low-pass filter 17 is away from the image taking element 16. Therefore, even if the foreign matter or dust adheres to the low-pass filter 17, it is tiny and inconspicuous as its image.

Figure 13:
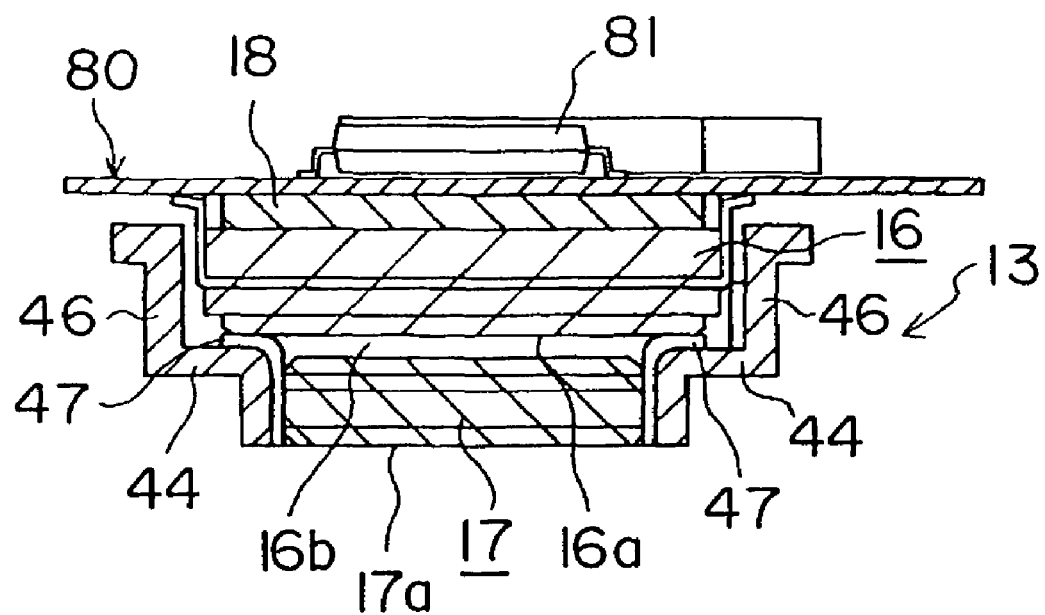
FIG. 13 is a view showing a connection structure, according to a modification, of the image taking element and a low-pass filter to a second slider.

FIG. 13 shows a modification to the connection structure of the image taking element 16 and the low-pass filter 17 to the second slider 13. In FIG. 13, only the second slider 13, the image taking element 16 fixed to the second slider 13, the low-pass filter 17 fixed thereto, and the first circuit board 80 fixed thereto are shown; and in the figure, the base plate 12 and the first slider 14 are not shown.

According to the modification, as shown in the figure, the low-pass filter 17 is fixed inside the opening 48 of the second slider 13, with the low-pass filter 17 being supported by a resilient fixing members 47. The fixing member 47 has a sleeve-shaped end part which is in contact with a bottom wall 44 of the second slider 13. The image taking element 16 disposed above it, is biased, or pushed, against the heat radiating plate 18 so as to be in close contact with the heat radiating plate 18, by the sleeve-shaped end part of the resilient fixing member 47. By providing the sleeve-shaped end part, the effective image taking surface 16a of the image taking element 16 is sealed from outside. That is, the foreign matter, or dust, having entered through a gap between the peripheral wall 46 of the second slider 13 and the image taking element 16 is prevented from adhering to the effective image taking surface of the image taking element 16 by the sleeve-shaped end part of the resilient fixing members 47.

Also, the image taking element 16 and the low-pass filter 17 are disposed in the second slider 13 in a state in which a first surface of the image taking element 16 and a second surface, opposing the first surface, of the low-pass filter 17, are separated from each other by a distance 16b which approximately corresponds to the thickness of the sleeve-shaped end part. Consequently, the distance between the image taking surface 16a of the image taking element 16 and the outer surface 17a of the low-pass filter 17 is longer than that of the embodiment shown in FIGS. 4 and 5.

According to this modification, since the effective image taking surface 16a of the image taking element 16 is sealed with the low-pass filter 17 and the fixing member 47, the foreign matter does not adhere to the image taking surface 16a of the image taking element 16. Also, since the distance between the image taking surface 16a of the image taking element 16 and the outer surface 17a of the low-pass filter 17 is longer than that of the embodiment illustrated in FIGS. 4 and 5, the foreign matter or dust which may adhere to the surface 17a of the low-pass filter 17 is more inconspicuous in the image of the object photographed.

As described above, in the image taking device according to the preferred embodiment and to the modification(s) thereto, the image taking element 16 can be moved, or swung, in the X-axis direction and the Y-axis direction relative to the base plate 12, by driving the first and second linear actuators 28 and 56 so that an image blur caused by a shake or vibration of the camera body detected by the gyro circuit 86 is corrected or compensated.

Also, since the surface of the image taking element 16 is sealed by the low-pass filter 17, the foreign matter having entered therein can be prevented from adhering to the image taking surface 16a of the image taking element 16.

Although the present invention has been fully described in connection with the preferred embodiment thereof with reference to the accompanying drawings, it is to be noted that various other changes and modifications are also apparent to those skilled in the art.

For example, according to the preferred embodiment, the second linear actuator 56 is mounted on the second slider 13, and the second slider 13 is constructed as a self-running slider. Alternatively, instead of the construction, the second linear actuator can be mounted on the first slider 14, so as to slidably move the second slider relative to the first slider. This type of construction also realizes similar effect(s) and advantage(s) to those aforementioned. By the way, in the arrangement, the rod holding arm(s) is/are provided on the first slider 14, and the second rod abutment portion is provided on the second slider 13.

Also, according to the preferred embodiment, the circuit board is divided into two so that the second circuit board 82 and the first circuit board 80 overlap one over the other in the direction of the optical axis, or so that the second circuit board 82 and the first circuit board 80 oppose each other. Alternatively, instead of the construction, the sizes and positions of the first and second circuit boards 80 and 82 can be changed so that only parts thereof overlap one over the other.

Also, according to the preferred embodiment, the gyro circuit 86 is mounted on the lens barrel 3, and the gyro circuit 86 transmits the signal(s) of the angular speed to the first and second circuit boards 80 and 82. Alternatively, instead of the construction, the gyro circuit(s) maybe directly mounted to the opposing surfaces of the first and second circuit boards 80 and 82. In this arrangement, the microcomputer 102 performs a control in such a manner that the first and second actuators 28 and 56 are driven so that the signal of the angular speed outputted from the gyro circuit becomes zero.

The image taking device according to the preferred embodiment of the present invention, is applied to the digital camera, as one example. However, the application of the image taking device is not limited to the digital camera; that is, the image taking device can be applied to another type of camera.

Such changes and modifications are also to be understood as included within the scope of the present invention as defined by the appended claims unless they depart therefrom.

What is claimed is:

1. An image taking device comprising:
    an image taking element which is provided movably in parallel with a light receiving surface of the image taking element, the image taking element being provided with a transparent cover over an effective image taking surface of the image taking element; and
    a cover which is provided with respect to the image taking element so as to hermetically cover at least a part of the transparent cover of the image taking element, in which a part, corresponding to the effective image taking surface, of the cover, is made of a transparent member;
    a biasing device for elastically biasing the cover against the image taking element,
    wherein the cover is moved together with the image taking element.

2. The image taking device as claimed in claim 1, wherein the transparent member functions as a filter to cut infrared rays.

3. An image taking device comprising:
    an image taking element which is provided movably in parallel with a light receiving surface of the image taking element;
    a cover which is provided with respect to the image taking element so as to hermetically cover at least an effective image taking surface of the image taking element, in which a part, corresponding to the effective image taking surface, of the cover, is made of a transparent member; and
    a biasing device for elastically biasing the cover against the image taking element,
    wherein the cover is moved together with the image taking element, and
    wherein the cover is closely provided on an image taking surface, including the effective image taking surface, of the image taking element.

4. An image taking device comprising:
    a lens barrel;
    an image taking element;
    a circuit board on which the image taking element is mounted;
    a driver for moving the image taking element and the circuit board with respect to the lens barrel, the driver including:
        a base plate for supporting a first actuator which extends in a first direction, in which the base plate is fixed to the end of the lens barrel;
        a first slider which slidably engages with the first actuator, in which the first slider is movable in the first direction with respect to the base plate; and
        a second slider for supporting a second actuator which extends in a second direction perpendicular to the first direction, in which the first slider slidably engages with the second actuator, and in which the second slider is movable in the second direction with respect to the first slider, the image taking element being fixed to the second slider;
    wherein the image taking element and the circuit board are provided on an end of the lens barrel, in which the image taking element and the circuit board are movable within a surface which is perpendicular to an optical axis, and
    wherein the driver is provided around the image taking element and is provided in a space between the circuit board and the end of the lens barrel.

5. The image taking device as claimed in claim 4, wherein each of the base plate, the first slider and the second slider is annular in shape, and
    wherein the second slider is provided in a central space of the first slider and in a central space of the base plate.

6. The image taking device as claimed in claim 4, wherein each of the first actuator and the second actuator is an actuator employing at least one piezoelectric element.

7. The image taking device as claimed in claim 4, further comprising at least one component which is physically separated from the image taking element, the at least one component being held by the circuit board, the at least one component adapted to execute signal processing.

8. An image taking device comprising:
    a lens barrel;
    an image taking element;
    a circuit board on which the image taking element is mounted;
    a driver for moving the image taking element and the circuit board with respect to the lens barrel, the driver including:
        a base plate for supporting a first actuator which extends in a first direction, in which the base plate is fixed to the end of the lens barrel;
        a first slider which slidably engages with the first actuator, in which the first slider is movable in the first direction with respect to the base plate;
        a second slider for supporting a second actuator which extends in a second direction perpendicular to the first direction, in which the first slider slidably engages with the second actuator, and in which the second slider is movable in the second direction with respect to the first slider, the image taking element being fixed to the second slider;
    wherein the image taking element and the circuit board are located in said image taking device at a location at an image side of an end of the lens barrel, in which the image taking element and the circuit board are movable within a surface which is perpendicular to an optical axis, and
    wherein the driver is provided around the image taking element with the driver being arranged in a direction perpendicular to the optical axis of the image taking element and is provided in a space between the circuit board and the end of the lens barrel.

9. The image taking device as claimed in claim 8, wherein each of the base plate, the first slider and the second slider is annular in shape, and
    wherein the second slider is provided in a central space of the first slider and in a central space of the base plate.

10. The image taking device as claimed in claim 8, wherein each of the first actuator and the second actuator is an actuator employing at least one piezoelectric element.

11. The image taking device as claimed in claim 8, further comprising at least one component which is physically separated from the image taking element, the at least one component being held by the circuit board, the at least one component adapted to execute signal processing.

12. An image taking device comprising:
    a lens barrel;
    an image taking element;

a circuit board on which the image taking element is mounted, the image taking element and the circuit board being located in the image taking device at a location at an image side of an end of the lens barrel; and a driver adapted to move the image taking element and the circuit board with respect to the lens barrel within a surface that is perpendicular to an optical axis of the image taking element, the driver being provided around the image taking element, the driver being provided in a space between the circuit board and the end of the lens barrel, the driver being arranged in a direction perpendicular to the optical axis of the image taking element, the driver including:

an actuator, an entirety of the actuator being provided in the space between the circuit board and the end of the lens barrel.

* * * * *